(12) United States Patent
Wang et al.

(10) Patent No.: US 12,554,798 B2
(45) Date of Patent: Feb. 17, 2026

(54) FINDING OUTLIERS IN SIMILAR TIME SERIES SAMPLES

(71) Applicant: INTERNATIONAL BUSINESS MACHINES CORPORATION, Armonk, NY (US)

(72) Inventors: Ye Wang, Xi'an (CN); Xiang Yu Yang, Xi'an (CN); Yong Wang, Xi'an (CN); Deng Xin Luo, Xi'an (CN); Zhong Fang Yuan, Xi'an (CN); Zhi Yong Jia, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 1115 days.

(21) Appl. No.: 17/537,705

(22) Filed: Nov. 30, 2021

(65) Prior Publication Data

US 2023/0169152 A1 Jun. 1, 2023

(51) Int. Cl.
*G06F 18/2113* (2023.01)
*G06F 18/21* (2023.01)
(Continued)

(52) U.S. Cl.
CPC .... *G06F 18/23213* (2023.01); *G06F 18/2113* (2023.01); *G06F 18/2163* (2023.01); *G06N 20/00* (2019.01)

(58) Field of Classification Search
CPC ........... G06F 18/23213; G06F 18/2113; G06F 18/2163; G06F 17/18; G06F 18/23;
(Continued)

(56) References Cited

U.S. PATENT DOCUMENTS 8,526,735 B2 9/2013 Inagaki
10,503,967 B2 * 12/2019 Sarrafzadeh ........... G06N 20/00
(Continued)

FOREIGN PATENT DOCUMENTS

CN 102945320 2/2013
CN 103279643 A 9/2013
(Continued)

OTHER PUBLICATIONS

Tapinos et. al., A Method for Comparing Multivariate Time Series with Different Dimensions, Published In: PLOS One, Published Date: Feb. 5, 2013, https://www.ncbi.nlm.nih.gov/pmc/articles/PMC3564859/pdf/pone.0054201.pdf, 11 pages.
(Continued)

*Primary Examiner* — Hien L Duong
(74) *Attorney, Agent, or Firm* — Harrity & Harrity, LLP

(57) ABSTRACT

A method, computer program product, and computer system for finding outliers in multi-dimensional time series samples. Each time series sample is divided into at least 2 sub samples having equal time duration. At least one prediction model is pre-trained using the sub samples and a prediction result for each sub sample for each prediction model is obtained by executing the pre-trained prediction models with the time series samples as input. A Shapely value corresponding to each prediction result is sub samples for each prediction model to generate multiple clusters of Shapely values for each prediction model. Highest ranking Shapely value outliers are determined from analysis of the multiple clusters. Highest ranking outlier sub samples corresponding to the highest ranking Shapely value outliers are identified.

20 Claims, 12 Drawing Sheets

(51) Int. Cl.
*G06F 18/23213* (2023.01)
*G06N 20/00* (2019.01)

(58) Field of Classification Search
CPC .......... G06N 20/00; G06N 5/01; G06N 20/10; G06N 20/20; G06V 10/26; G06V 10/774
See application file for complete search history.

(56) References Cited

U.S. PATENT DOCUMENTS

| | | | |
|---|---|---|---|
| 11,215,485 B2* | 1/2022 | Kausler | G01D 3/08 |
| 2014/0114722 A1* | 4/2014 | Mohan | G06Q 30/0201 |
| | | | 705/7.29 |
| 2015/0235139 A1 | 8/2015 | Sharma | |
| 2017/0147930 A1 | 5/2017 | Bellala | |
| 2018/0262927 A1* | 9/2018 | Narayanam | H04W 16/18 |
| 2019/0313947 A1* | 10/2019 | Li | A61B 5/067 |
| 2019/0394102 A1* | 12/2019 | Bandi | G06F 11/3452 |
| 2020/0162497 A1* | 5/2020 | Iyer | H04L 63/164 |
| 2021/0058424 A1* | 2/2021 | Chang | G06F 11/3409 |
| 2021/0125076 A1* | 4/2021 | Zhang | G08G 1/0137 |
| 2021/0208995 A1* | 7/2021 | de Abreu Pinho | G06F 18/22 |
| 2021/0344695 A1* | 11/2021 | Palani | G06N 3/043 |
| 2021/0365478 A1* | 11/2021 | Mopur | G06F 18/2433 |
| 2021/0383275 A1* | 12/2021 | Miroshnikov | G06F 18/24137 |
| 2022/0080988 A1* | 3/2022 | Lin | B60W 50/14 |
| 2022/0114594 A1* | 4/2022 | Nunes | G06Q 20/4016 |
| 2022/0188701 A1* | 6/2022 | Röder | G16H 10/60 |
| 2022/0207326 A1* | 6/2022 | Zaker Habibabadi | G06N 3/045 |
| 2022/0222689 A1* | 7/2022 | Chatterjee | G06Q 10/109 |
| 2022/0253426 A1* | 8/2022 | Zhu | G06N 3/044 |
| 2022/0283577 A1* | 9/2022 | Zhang | G05B 23/0221 |
| 2022/0285028 A1* | 9/2022 | Ediebah | G16H 50/20 |
| 2023/0022401 A1* | 1/2023 | Amiri | H04L 41/16 |
| 2023/0035541 A1* | 2/2023 | Liu | G06F 18/2193 |
| 2023/0076559 A1* | 3/2023 | Sankarapu | G06Q 40/03 |
| 2023/0094635 A1* | 3/2023 | Meng | G06N 5/01 |
| | | | 705/7.29 |
| 2023/0157647 A1* | 5/2023 | Lambein | A61B 5/7246 |
| | | | 600/479 |
| 2023/0410017 A1* | 12/2023 | Dwivedi | G06Q 50/08 |

FOREIGN PATENT DOCUMENTS

| | | |
|---|---|---|
| CN | 106295683 A | 1/2017 |
| CN | 112154418 A | 12/2020 |
| JP | WO2010087125 | 8/2010 |
| WO | 2010/087125 A1 | 8/2010 |

OTHER PUBLICATIONS

MD Rakibul Alam et. al., Adaptable Anomaly Detection in Traffic Flow Time Series, Published In: 2019 6th International Conference on Models and Technologies for Intelligent Transportation Systems (MT-ITS), Published Date: Jun. 7, 2019, https://ieeexplore.ieee.org/abstract/document/8883338, 9 pages.

Qiao et. al., Multiple Time Series Anomaly Detection Based on Compression and Correlation Analysis: A Medical Surveillance Case Study, Published In: APWeb 2012: Web Technologies and Applications, Published Date: Feb. 5, 2013, https://link.springer.com/chapter/10.1007/978-3-642-29253-8_25, 12 pages.

Golmohammadi et al., Time Series Contextual Anomaly Detection for Detecting Market Manipulation in Stock Market, Published In: 2015 IEEE International Conference on Data Science and Advanced Analytics (DSAA), Published Date: Oct. 21, 2015, https://sites.ualberta.ca/~golmoham/DSAA2015/DSAA_2015_submission_291.pdf, 10 pages.

Yu et. al., Time Series Outlier Detection Based on Sliding Window Prediction, Published In: Mathematical Problems in Engineering, Published Date: Oct. 30, 2014, https://www.hindawi.com/journals/mpe/2014/879736/, 15 pages.

Mell, Peter et al.; "The NIST Definition of Cloud Computing;" National Institute of Standards and Technology; Special Publication 800-145; Sep. 2011; 7 pages.

* cited by examiner

FINDING OUTLIERS IN SIMILAR TIME SERIES SAMPLES

BACKGROUND

The present invention relates in general to samples of time series data, and in particular to finding outliers in multi-dimensional time series samples.

SUMMARY

Embodiments of the present invention provide a method, a computer program product and a computer system, for finding outliers in multi-dimensional time series samples.

One or more processors of a computer system divide each time series sample of N time series samples into at least 2 sub samples having equal time duration, wherein N is at least 2, wherein each time series sample is a M-dimensional time series sample having M dimensions, wherein M is at least 2, wherein each dimension of the M dimensions is a different attribute expressed as a function of time by each time series sample, wherein each sub sample is an M-dimensional sub sample having the M dimensions.

The one or more processors pre-train each prediction model of L prediction models using the M-dimensional sub samples and obtaining, by the one or more processors from executing the L pre-trained prediction models with the N time series samples as input, an M-dimensional prediction result for each M-dimensional sub sample for each prediction model, wherein L is at least 1.

The one or more processors compute a M-dimensional Shapely value corresponding to each M-dimensional prediction result for each M-dimensional sub sample for each prediction model, wherein each dimension of the M-dimensional Shapely value corresponds to a respective dimension of each M-dimensional time series sample.

The one or more processors cluster the M-dimensional Shapely values for the M-dimensional sub samples for each prediction model to generate multiple clusters of M-dimensional Shapely values for each prediction model.

The one or more processors determine, from analysis of the multiple clusters of the L prediction models, H highest ranking M-dimensional Shapely value outliers, wherein each of the H highest ranking M-dimensional Shapely value outliers is specific to one dimension of the M dimensions, wherein H is at least 1.

The one or more processors identify H outlier sub samples corresponding to the H Shapely value outliers, wherein each of the H outlier sub samples is specific to the one dimension.

DETAILED DESCRIPTION

Figure 1:
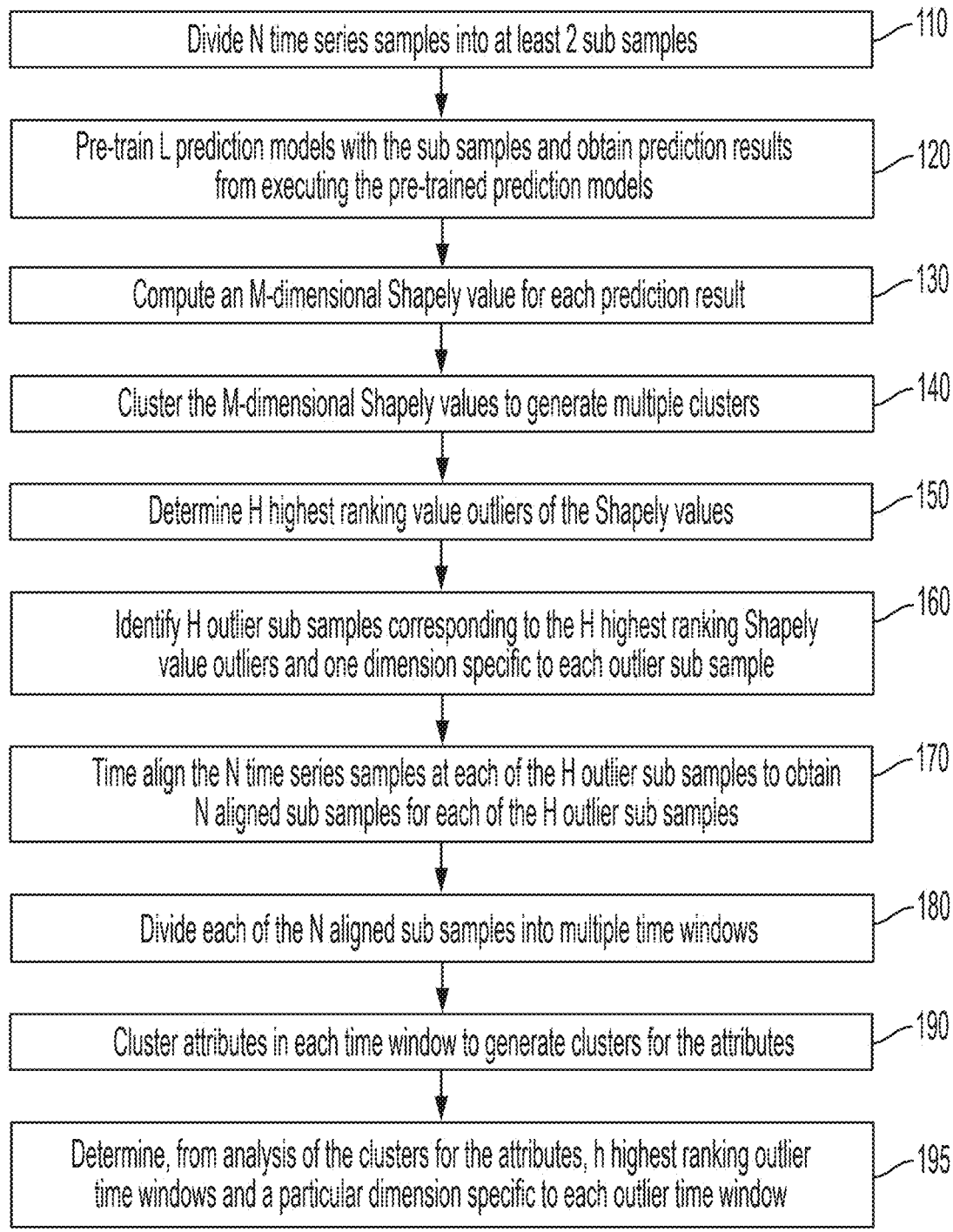
FIG. 1 is a flow chart describing embodiments of a method for finding outliers in multi-dimensional time series samples, in accordance with embodiments of the present invention.

Time series data is a common data forma. In a real production environment, generation of data is often accompanied by time stamps and in industrial manufacturing, financial consumption, and other fields, time series data is indispensable. However, how to determine outliers for a group of similar time series data is a difficult problem.

For a group of similar time series data having same dimensions (i.e., attributes such as current, voltage, temperature, etc.) may have data over different lengths of time. Traditional statistical methods, such as quantile, mean, variance, kurtosis, kurtosis and so on, cannot effectively measure the differences between different time series in the group and locate time intervals of the differences. With time series data, some anomaly recognition methods cannot be used directly.

In a battery charging and discharging test, there are various attributes of time series data, such as floating charge current, discharge current, original voltage, power quality, temperature, etc. There are different operation steps in the charge/discharge test, such as charging with different voltage power supplies and discharging at different temperatures. Multiple operations constitute a complete experiment. Each battery in a group of batteries will produce a set of multi-dimensional (such as current, voltage, temperature, etc.) time series data. The traditional statistical indicators, such as mean, quantile, kurtosis and so on, cannot effectively measure the differences between different dimensions and different samples of multi-dimensional data, and cannot identify abnormal data such as outliers.

Embodiments of the present invention effectively solve the preceding problem associated with the battery charging and discharging test. For example, a battery factory produced a batch of batteries. 100 batteries were for testing, and the current, voltage and temperature of the batteries were recorded as a function of time during the test. The whole test lasted 12 hours. The input data for an embodiment of a method of the present invention is 100 three-dimensional (current, voltage, temperature) time series samples with length of 12 hours for each sample. The data is recorded once per second, so the length of time of each sample is 12*3600 seconds and the size of the data is 12 (hours)*3600 (seconds/hour)*3 (current, voltage, temperature), which constitutes input to the embodiment of the method. The output is the sample number, time period of the outlier and the dimension to which the outlier is applicable (e.g., Sample7, 15thmin-16thmin, temperature).

Thus, the problem solved by embodiments of the present invention is, in a group of similar time series samples, finding abnormal samples (outliers) and an associated abnormal dimension in an outlier time period, by: pre-training prediction models, using the pre-trained prediction models to obtain prediction results of sub samples of the time series samples, calculating Shapely multi-dimensional values from the prediction results, clustering the Shapely multi-dimensional values, determining outlier sub samples of clusters from the Shapely clusters, time aligning the time series samples at the outlier sub samples, dividing the time aligned outlier sub samples into time windows sized according to attribute volatility in the time windows, and then clustering the time windows to find outliers (e.g., temperature of the second sample is abnormal from the 10th minute to the 11th minute).

FIG. 1 is a flow chart describing embodiments of a method for finding outliers in multi-dimensional time series samples, in accordance with embodiments of the present invention. The flow chart of FIG. 1 includes steps 110-195

Step 110 divides each time series sample of N time series samples into at least 2 equal sub samples, wherein N is at least 2. Each time series sample is an M-dimensional time series sample having M dimensions, wherein M is at least 2. Each dimension of the M dimensions is a different attribute expressed as a function of time by each time series sample, wherein each sub sample is an M-dimensional sub sample having the M dimensions.

Figure 2:
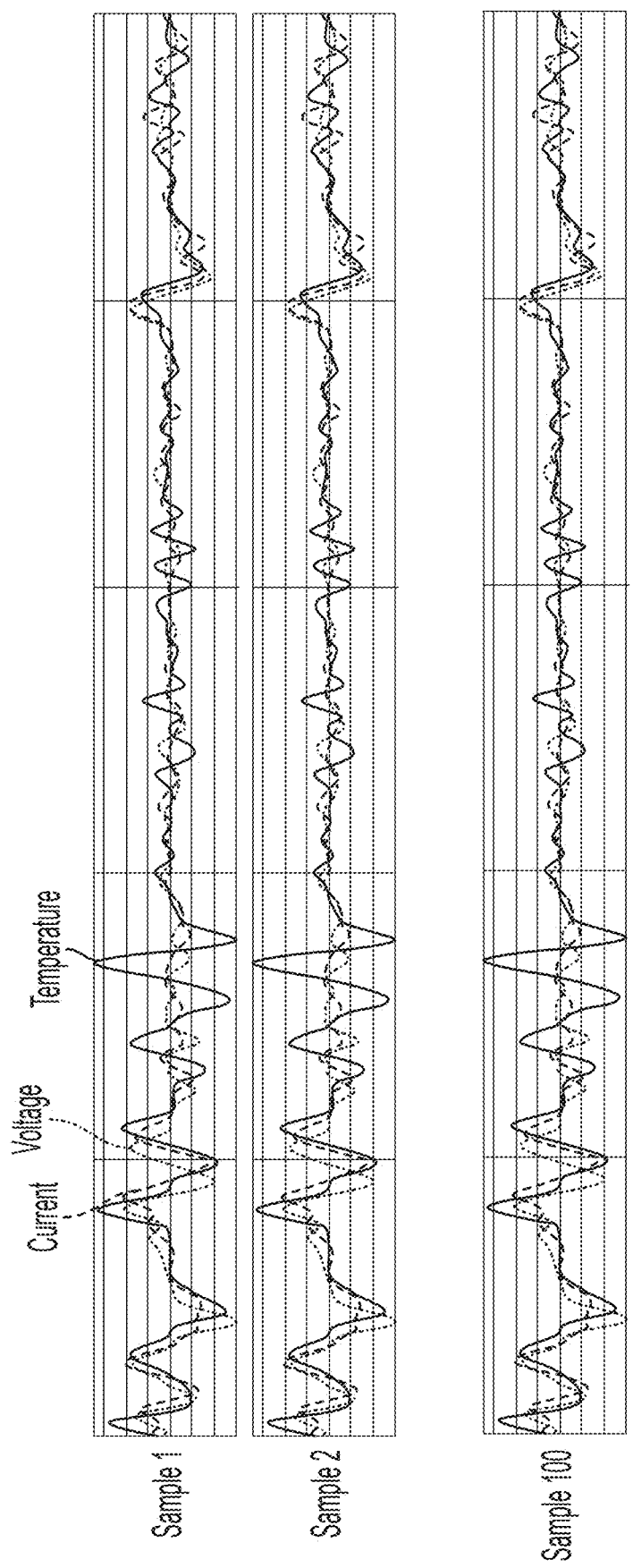
FIG. 2 illustrates 100 time series samples, in accordance with embodiments of the present invention.

FIG. 2 illustrates 100 time series samples, in accordance with embodiments of the present invention. Each time series sample has 3 dimension (M=3) of Current, Voltage, and Temperature.

Figure 3:
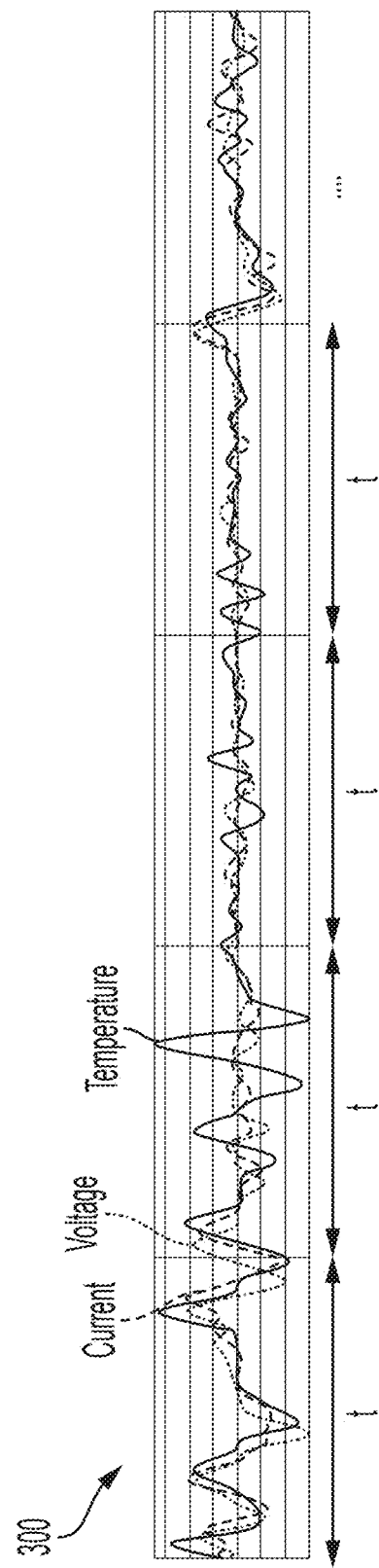
FIG. 3 illustrates dividing one time series sample from FIG. 2 into multiple sub samples of equal time duration, in accordance with embodiments of the present invention.

FIG. 3 illustrates an embodiment of step 110 of dividing one time series sample 200 from FIG. 2 into multiple sub samples of equal time duration t, in accordance with embodiments of the present invention. Step 120 pre-trains each prediction model of L prediction models with the M-dimensional sub samples and obtains, from executing the L pre-trained prediction models with the N time series samples as input, an M-dimensional prediction result for each M-dimensional sub sample for each prediction model, wherein L is at least 1.

The one time series sample in FIG. 3 has 3 dimensions (M=3) of Current, Voltage, and Temperature.

Figure 4:
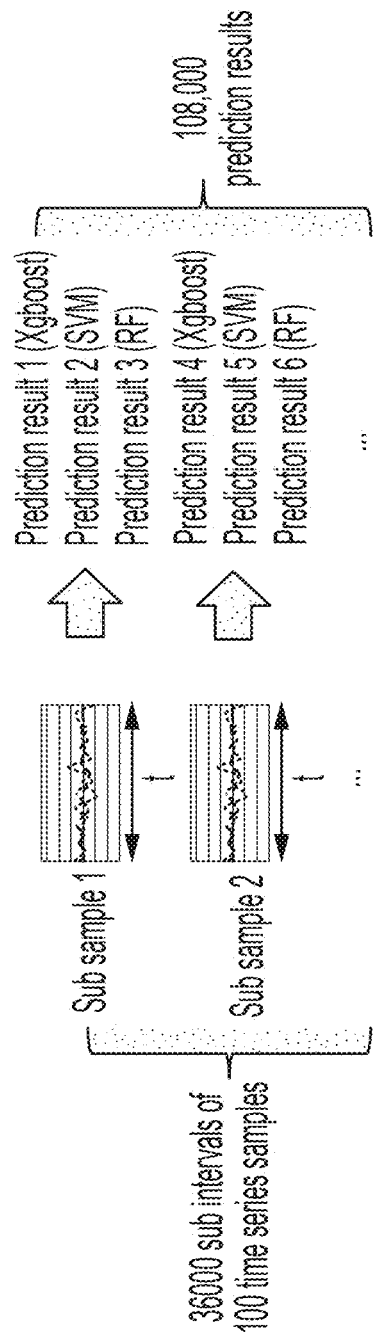
FIG. 4 illustrates use of 3 prediction models that are pre-trained by 3-dimensional sub samples, in accordance with embodiments of the present invention.

FIG. 4 illustrates use of 3 prediction models (L=3) that are pre-trained using 3-dimensional sub samples (M=3), in accordance with embodiments of the present invention. A M-dimensional prediction result is obtained for each M-dimensional sub sample for each prediction model, from executing the 3 pre-trained prediction models with 100 time series samples (N=100) as input.

Each prediction result in FIG. 4 is a 3-dimensional array whose elements denote the three dimensions of Current, Voltage, and Temperature. The 3 prediction models are Extreme Gradient Boosting (Xgboost), Support Vector Machines (SVM), and Random Forest (RF). If each time series sample has a time length of 12 hours and t=2 minutes, then each time series sample has been divided into 360 sub samples (12*60/2), the 100 time series samples include 36000 sub intervals (360*100), and the 3 models generate prediction results 108,000 (36000*3) of the sub samples for the three models. Each prediction result is a 3-dimensional array denoting Current, Voltage, and Temperature.

Step 130 computes a M-dimensional Shapely value corresponding to each M-dimensional prediction result for each M-dimensional sub sample for each prediction model Each dimension of the M-dimensional Shapely value corresponds to a respective dimension of each M-dimensional time series sample. The Shapely value of each dimension is a relative contribution of each dimension to each M-dimensional sub sample. For example, a 3-dimensional Shapely value of (87, 70, 91) are relative contributions of Current, Voltage, and Temperature, respectively.

Step 140 clusters the M-dimensional Shapely values for the M-dimensional sub samples for each prediction model to generate multiple clusters of M-dimensional Shapely values for each prediction model. The clustering in step 140 is performed by a clustering algorithm of a trained cluster model, which distributes the Shapely values into different clusters. Each cluster has a center. A distance between the cluster center and the Shapely data point is computed, so that the cluster center is based on all of the Shapley values in each cluster. To insert new data into a certain cluster, a distance (e.g., Euclidean distance) between the cluster center and the Shapely data point is computed and Shapely data point is placed in the cluster whose cluster center is closest to the Shapely data point.

Figure 5:
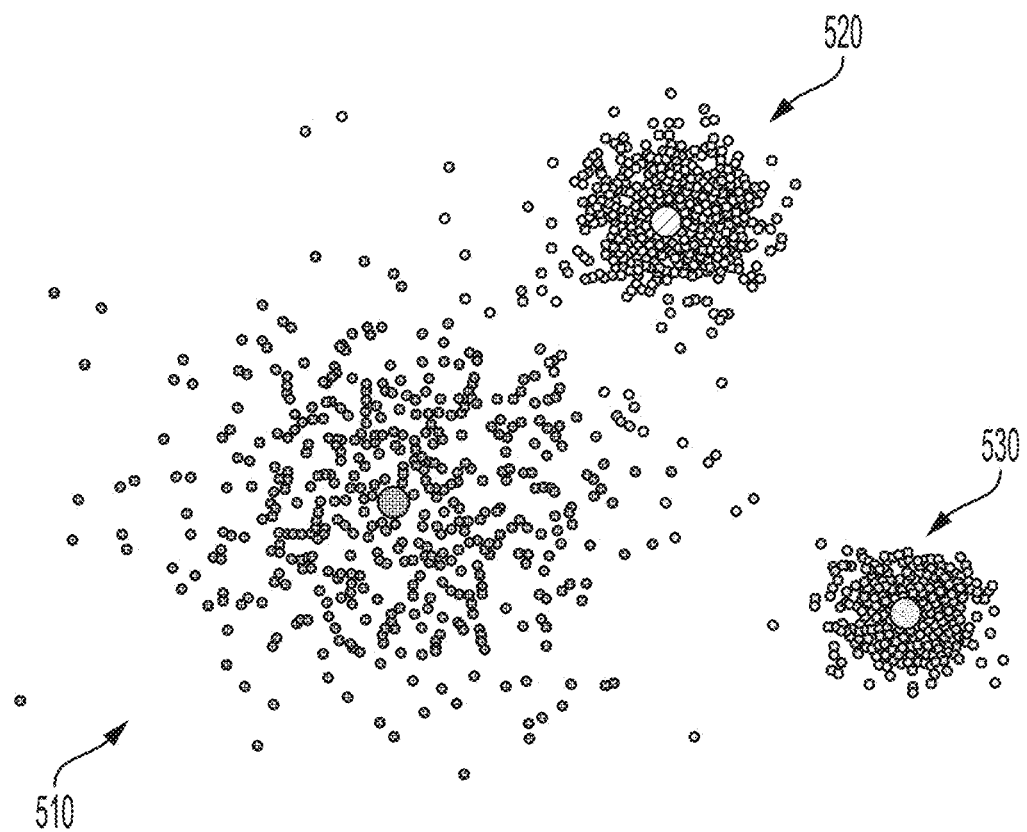
FIG. 5 illustrates multiple clusters formed from clustering Shapely values, in accordance with embodiments of the present invention.

FIG. 5 illustrates multiple clusters 510, 520 and 530 formed from clustering Shapely values, in accordance with embodiments of the present invention.

Step 150 determines, from analysis of the multiple clusters of the L prediction models, H highest ranking M-dimensional Shapely value outliers, wherein each of the H highest ranking M-dimensional Shapely value outliers is specific to one dimension (e.g., Current, Voltage, or Temperature) of the M dimensions, wherein H is at least 1.

In one embodiment, step 140 is implemented by clustering the M-dimensional Shapely values using K clustering algorithms to generate respective K groups of clusters, wherein K is at least 2; and step 150 is implemented by determining the H highest ranking M-dimensional Shapely value outliers via voting, by the K clustering algorithms, a ranking of M-dimensional Shapely value outliers to determine the H highest ranking M-dimensional Shapely value outliers.

Figure 6:
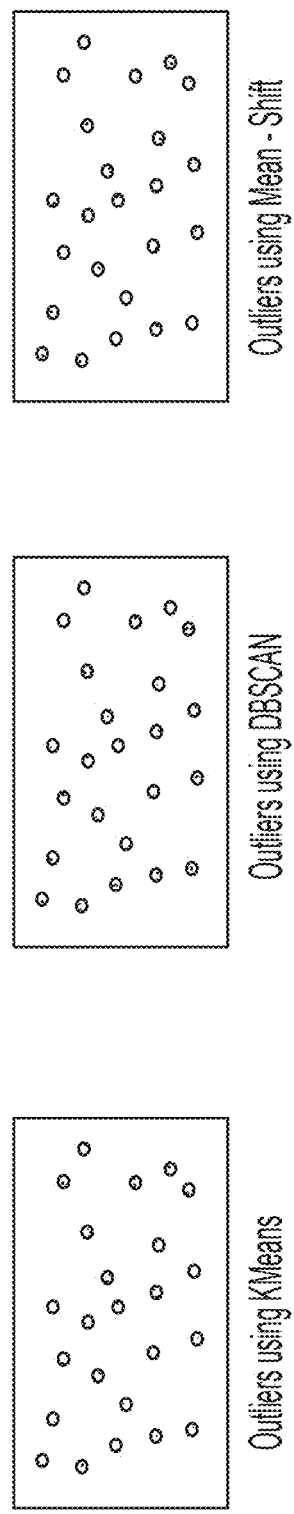
FIG. 6 illustrates 3 groups of Shapely value outliers in the clusters as respectively determined by three clustering algorithms, in accordance with embodiments of the present invention.

FIG. 6 illustrates 3 groups of Shapely value outliers in the clusters as respectively determined by three clustering algorithms (K=3) of KMeans, DBSCAN, and Mean-Shift, in accordance with embodiments of the present invention. There may be common outliers in the three groups. A voting process by the three clustering algorithms may be used to select the H highest ranking Shapely value outliers.

Step 160 identifies H outlier sub samples corresponding to the H Shapely value outliers, wherein each of the H outlier sub samples is specific to the one dimension ((e.g., Current, Voltage, or Temperature), which may be implemented from a correlation between Shapely values and sub samples. This correlation is known from, or derivable from, the computation, in step 130, of Shapely values from respective sub samples.

Steps 110-160, described supra, generate outlier sub samples each having a duration t.

Steps 170-195, described infra, generate outlier sub samples each having a duration less than t.

Step 170 aligns the N time series samples at each outlier sub sample of the H outlier sub samples to obtain N aligned sub samples for each outlier sub sample of the H outlier sub samples, which may be implemented, in one embodiment, by dynamic time warping (DTW).

Figure 7:
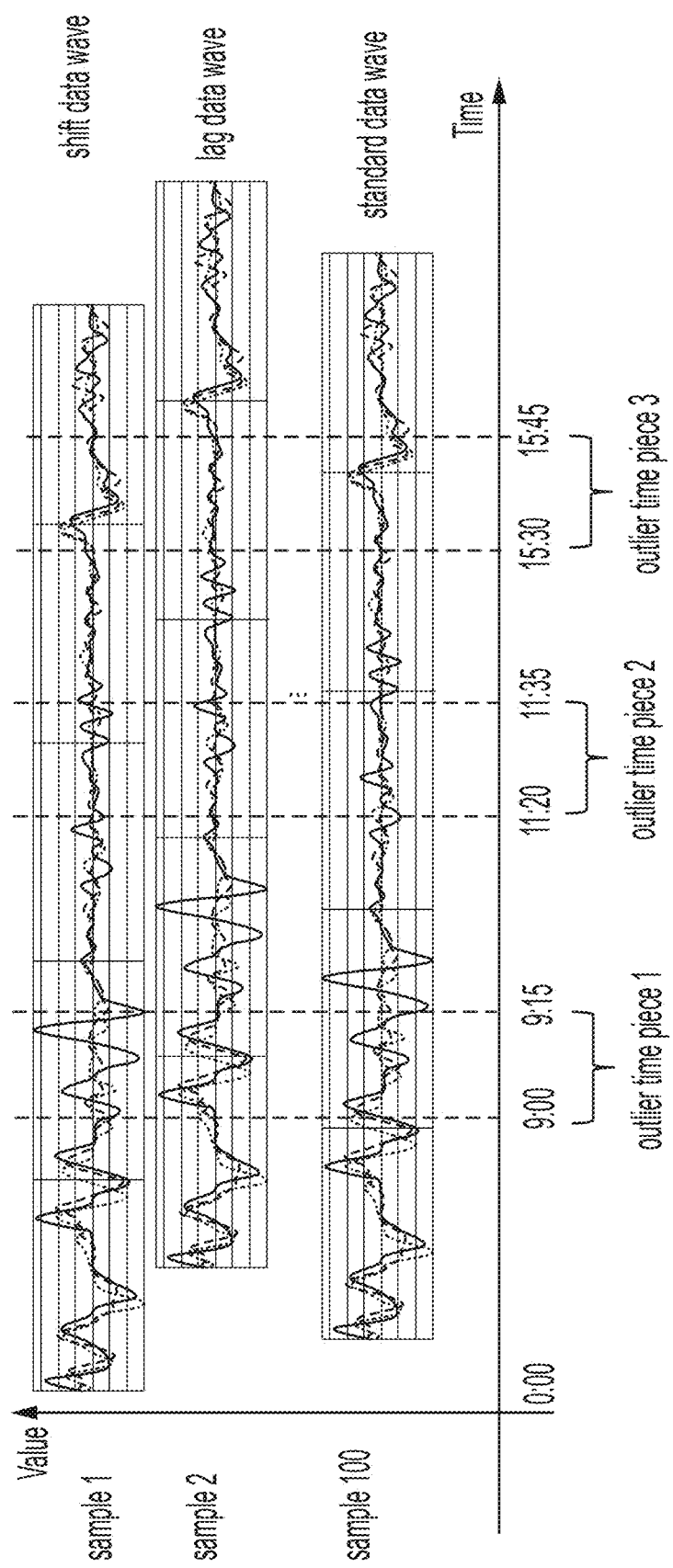
FIG. 7 illustrates multiple time series samples which are misaligned in time, in accordance with embodiments of the present invention.

FIG. 7 illustrates multiple time series samples which are misaligned in time, in accordance with embodiments of the present invention. The misalignment may be due to the time series samples being from different batches of the same production. Thus, the samples may have the similar wave shapes with subtle differences (e.g., different data collection times). Thus, the wave shapes are aligned in order to correlate outliers of the same sub samples in different time series samples.

Figure 8:
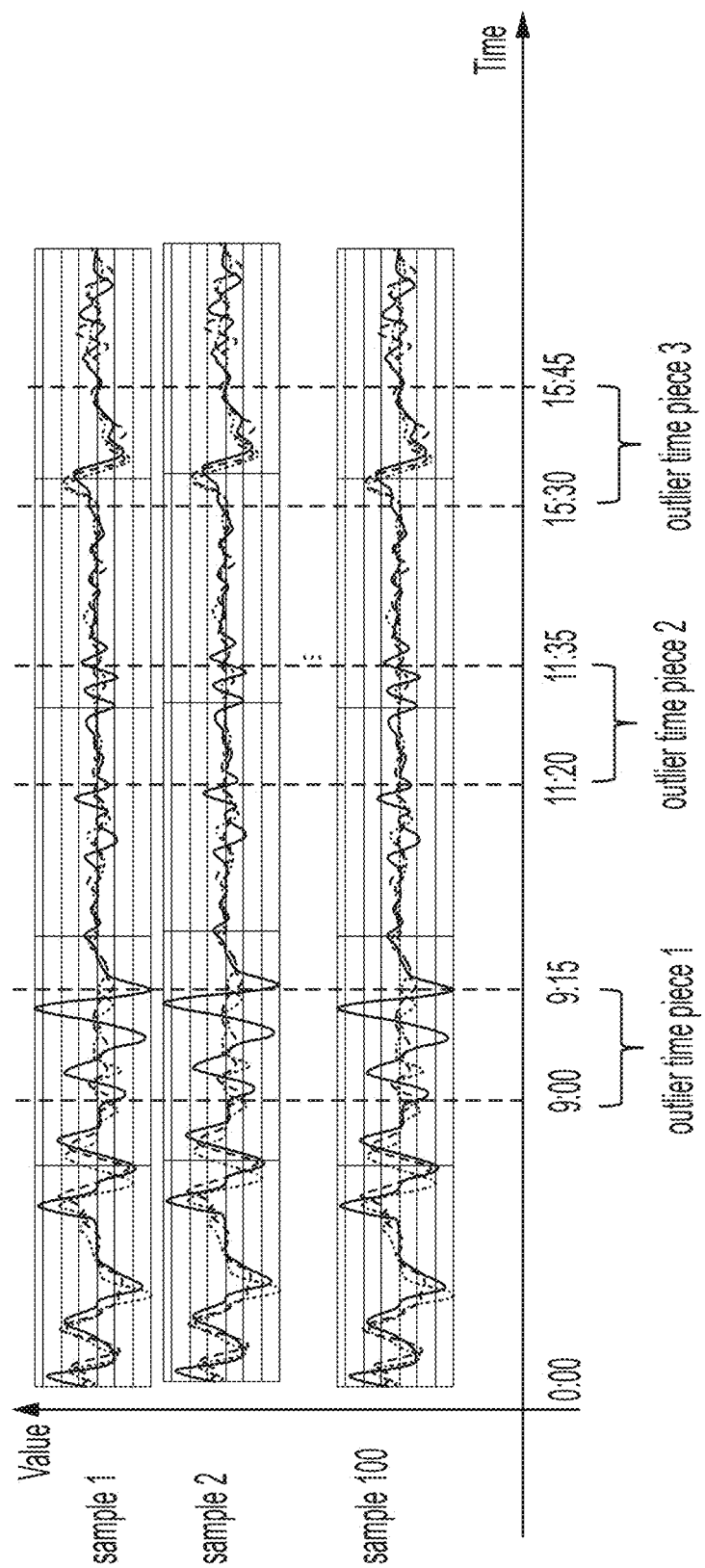
FIG. 8 illustrates the multiple time series samples of FIG. 7 after dynamic time warping (DTW) has been performed on the multiple time series samples, in accordance with embodiments of the present invention.

FIG. 8 illustrates the multiple time series samples of FIG. 7 after DTW has been performed on the multiple time series samples, in accordance with embodiments of the present invention.

Step 180 divides each aligned sub sample of the N aligned sub samples into multiple time windows, wherein a time duration of each time window is a monotonically decreasing function of a volatility of the attributes in each time window.

In one embodiment, the volatility of the attributes in each time window is a standard deviation of the attribute values in each time window, and the time duration of each time window varies inversely with the standard deviation.

In one embodiment, the volatility of the attributes in each time window is a variance of the attribute values in each time window, and the time duration of each time window varies inversely with the variance.

As is well known, the standard deviation is the square root of the variance.

Figure 9:
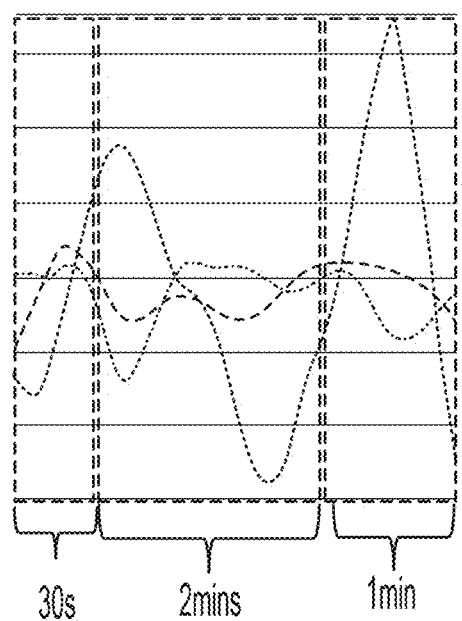
FIG. 9 illustrates dividing a sub sample into time windows, in accordance with embodiments of the present invention.

FIG. 9 illustrates dividing the sub sample 910 into time windows 911, 912 and 913, in accordance with embodiments of the present invention.

The time durations of 30 seconds, 2 minutes, and 1 minute for time windows 911, 912, and 913 are a monotonically decreasing function of the volatility in the time windows 911, 912, and 913, respectively.

Step 190 clusters the attributes in each time window to generate a plurality of clusters for the attributes. The clustering in step 190 is performed by a clustering algorithm of a trained cluster model, which distributes the attributes values into different clusters. Each cluster has a center. A distance between the cluster center and the attribute data point is computed, so that the cluster center is based on all of the attribute values in each cluster. To insert new data into a certain cluster, a distance (e.g., Euclidean distance) between the cluster center and the attribute data point is computed and attribute data point is placed in the cluster whose cluster center is closest to the attribute data point.

Step 195 determines, from analysis of the plurality of clusters for the attributes, h highest ranking outlier time windows, wherein each of the h highest ranking outlier time windows is specific to a particular dimension of the M dimensions, and wherein h is at least 1.

Figure 10:
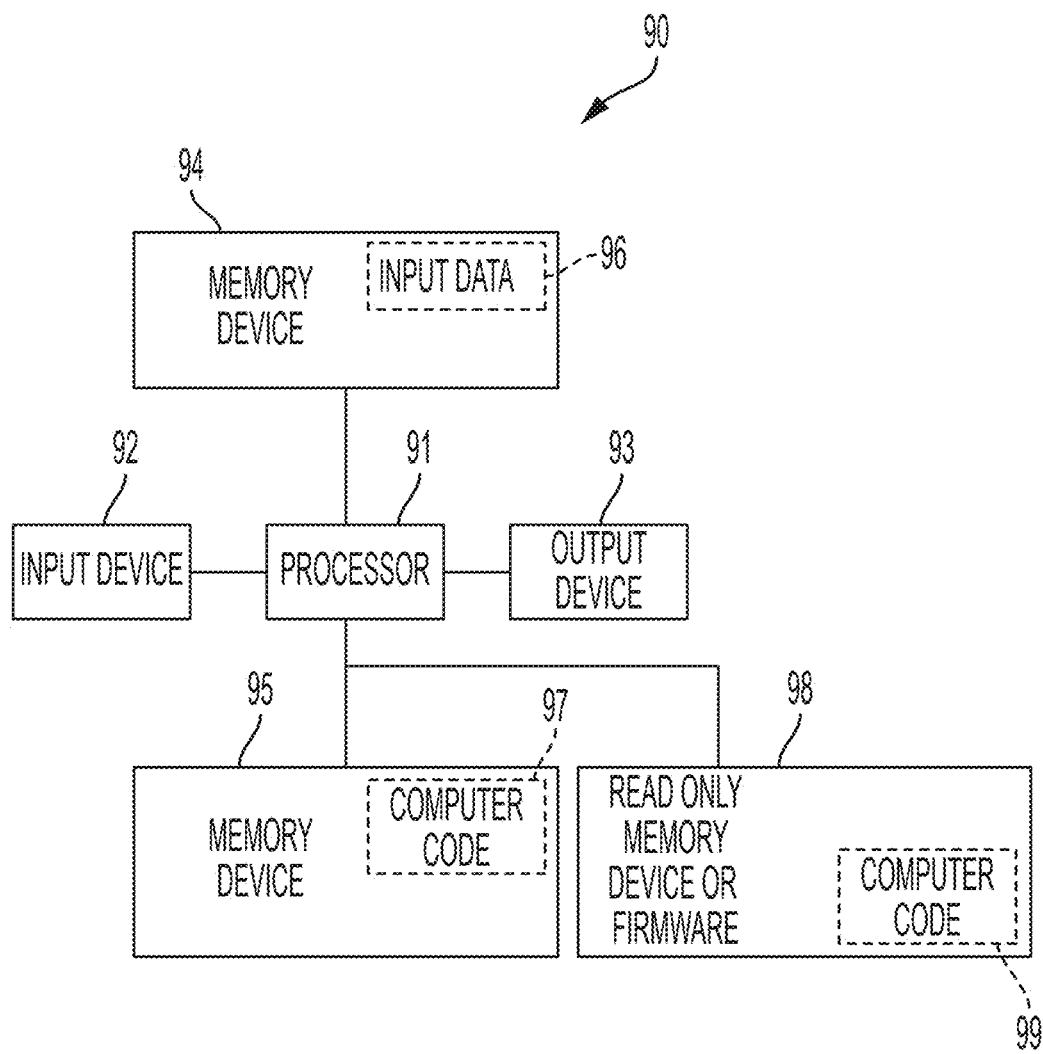
FIG. 10 illustrates a computer system, in accordance with embodiments of the present invention.

In one embodiment, step 190 is implemented by clustering the attributes in each time window using k clustering algorithms to generate respective k groups of clusters in each time window representing the plurality of clusters, wherein k is at least 2; and step 195 is implemented by determining the h highest ranking outlier time windows via voting, by the k clustering algorithms, a ranking of the outlier attribute values in the time windows to determine the h highest ranking outlier time windows FIG. 10 illustrates a computer system 90, in accordance with embodiments of the present invention.

The computer system 90 includes a processor 91, an input device 92 coupled to the processor 91, an output device 93 coupled to the processor 91, and memory devices 94 and 95 each coupled to the processor 91. The processor 91 represents one or more processors and may denote a single processor or a plurality of processors. The input device 92 may be, inter alia, a keyboard, a mouse, a camera, a touchscreen, etc., or a combination thereof. The output device 93 may be, inter alia, a printer, a plotter, a computer screen, a magnetic tape, a removable hard disk, a floppy disk, etc., or a combination thereof. The memory devices 94 and 95 may each be, inter alia, a hard disk, a floppy disk, a magnetic tape, an optical storage such as a compact disc (CD) or a digital video disc (DVD), a dynamic random access memory (DRAM), a read-only memory (ROM), etc., or a combination thereof. The memory device 95 includes a computer code 97. The computer code 97 includes algorithms for executing embodiments of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 98 (e.g., including algorithms) may be stored on a static, nonremovable, read-only storage medium such as a Read-Only Memory (ROM) device 99, or may be accessed by processor 91 directly from such a static, nonremovable, read-only medium 99. Similarly, in some embodiments, stored computer program code 97 may be stored as computer-readable firmware 99, or may be accessed by processor 91 directly from such firmware 99, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with cross-referencing metrics associated with plug-in components, generating software code modules, and enabling operational functionality of target cloud components. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with cross-referencing metrics associated with plug-in components, generating software code modules, and enabling operational functionality of target cloud components. In another embodiment, the invention provides a business method that performs the process steps of the invention on a subscription, advertising, and/or fee basis. That is, a service supplier, such as a Solution Integrator, could offer to enable a process for improving software technology associated with cross-referencing metrics associated with plug-in components, generating software code modules, and enabling operational functionality of target cloud components. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 10 shows the computer system 90 as a particular configuration of hardware and software, any configuration of hardware and software, as would be known to a person of ordinary skill in the art, may be utilized for the purposes stated supra in conjunction with the particular computer system 90 of FIG. 10. For example, the memory devices 94 and 95 may be portions of a single memory device rather than separate memory devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
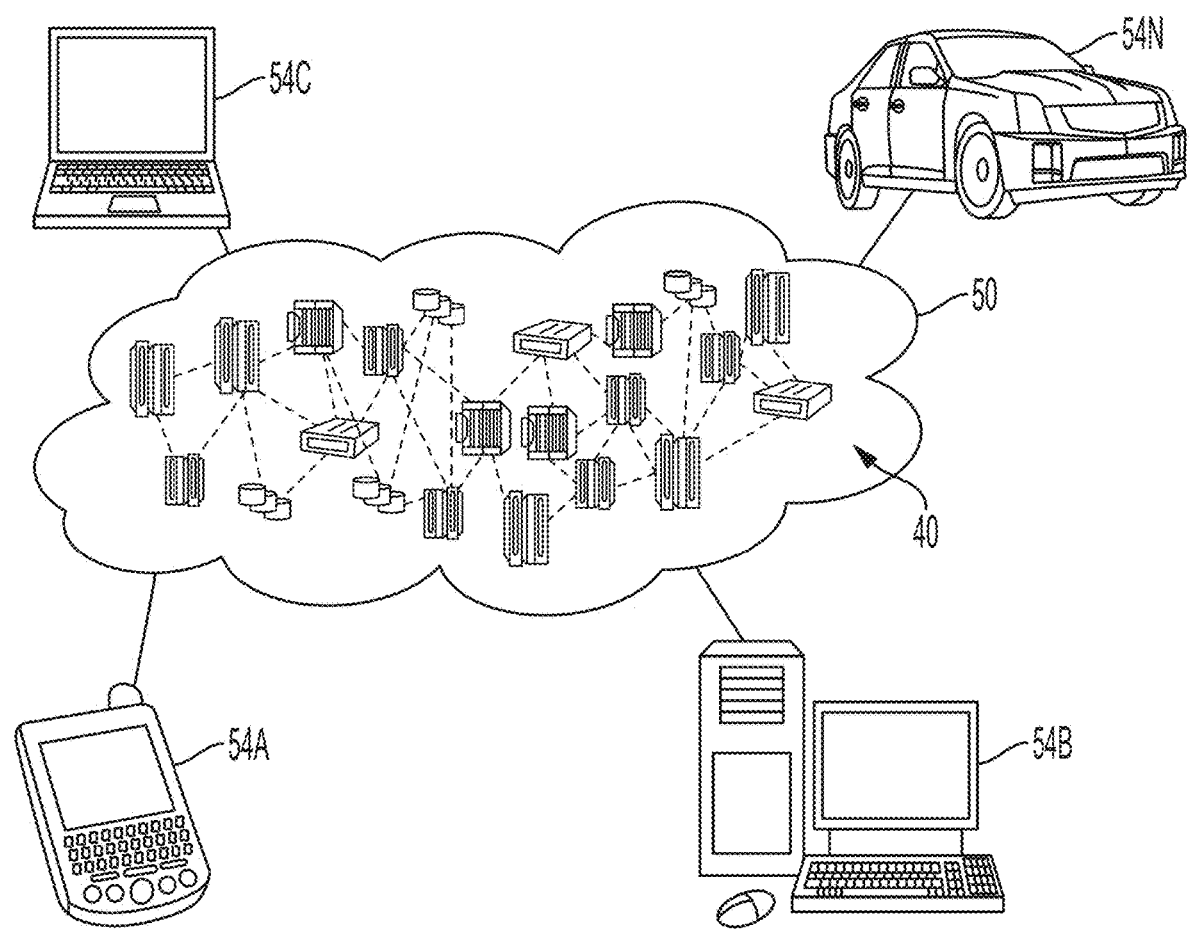
FIG. 11 depicts a cloud computing environment, in accordance with embodiments of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
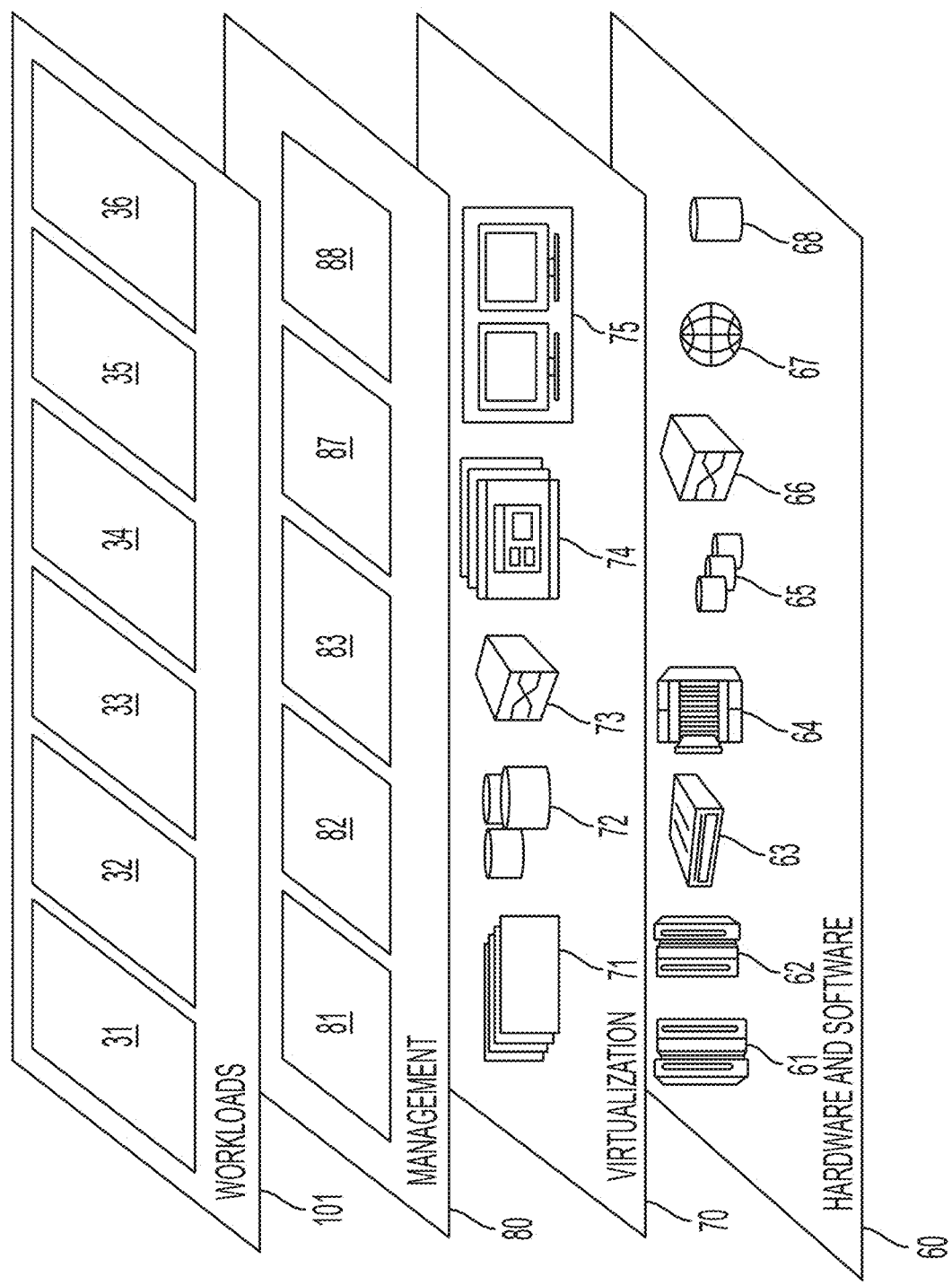
FIG. 12 depicts abstraction model layers, in accordance with embodiments of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 30 provides examples of functionality for which the cloud computing environment may be utilized. Examples of workloads and functions which may be provided from this layer include: mapping and navigation 31; software development and lifecycle management 32; virtual classroom education delivery 33; data analytics processing 34; transaction processing 35; and finding outliers in multi-dimensional time series samples 36.

Examples and embodiments of the present invention described herein have been presented for illustrative purposes and should not be construed to be exhaustive. While embodiments of the present invention have been described herein for purposes of illustration, many modifications and changes will become apparent to those skilled in the art. The description of the present invention herein explains the principles underlying these examples and embodiments, in order to illustrate practical applications and technical improvements of the present invention over known technologies, computer systems, and/or products.

What is claimed is:

1. A method for finding outliers in multi-dimensional time series samples, the method comprising:
   dividing, by one or more processors of a computer system, each time series sample of N time series samples into at least 2 sub samples having equal time duration, wherein N is at least 2, wherein each time series sample is a M-dimensional time series sample having M dimensions, wherein M is at least 2, wherein each dimension of the M dimensions is a different attribute expressed as a function of time by each time series sample, wherein each sub sample is an M-dimensional sub sample having the M dimensions;
   pre-training, by the one or more processors, each prediction model of L prediction models using the M-dimensional sub samples and obtaining, by the one or more processors from executing the L pre-trained prediction models with the N time series samples as input, an M-dimensional prediction result for each M-dimensional sub sample for each prediction model, wherein L is at least 1;
   computing, by the one or more processors, a M-dimensional Shapely value corresponding to each M-dimensional prediction result for each M-dimensional sub sample for each prediction model, wherein each dimension of the M-dimensional Shapely value corresponds to a respective dimension of each M-dimensional time series sample;
   clustering, by the one or more processors, the M-dimensional Shapely values for the M-dimensional sub samples for each prediction model to generate multiple clusters of M-dimensional Shapely values for each prediction model;
   determining, by the one or more processors from analysis of the multiple clusters of the L prediction models, H highest ranking M-dimensional Shapely value outliers, wherein each of the H highest ranking M-dimensional Shapely value outliers is specific to one dimension of the M dimensions, wherein H is at least 1;
   identifying, by the one or more processors, H outlier sub samples corresponding to the H highest ranking M-dimensional Shapely value outliers, wherein each of the H outlier sub samples is specific to the one dimension; and
   aligning, by the one or more processors and based on performing dynamic time warping (DTW), the N time series samples at each of the H outlier sub samples to obtain N aligned sub samples for each of the H outlier sub samples.

2. The method of claim 1, the method further comprising:
   dividing, by the one or more processors, each aligned sub sample of the N aligned sub samples into multiple time windows, wherein a time duration of each time window is a monotonically decreasing function of a volatility of attributes in each time window;
   clustering, by the one or more processors, the attributes in each time window to generate a plurality of clusters for the attributes in each time window; and
   determining, by the one or more processors from analysis of the plurality of clusters for the attributes in each time window, h highest ranking outlier time windows, wherein each of the h highest ranking outlier time windows is specific to a particular dimension of the M dimensions, sand wherein h is at least 1.

3. The method of claim 2, wherein the volatility is a standard deviation of attribute values in each time window, and wherein the time duration of each time window varies inversely with the standard deviation.

4. The method of claim 2, wherein the volatility is a variance of attribute values in each time window, and wherein the time duration of each time window varies inversely with the variance.

5. The method of claim 2, wherein the clustering the attributes in each time window comprises clustering the attributes in each time window using k clustering algorithms to generate respective k groups of clusters in each time window representing the plurality of clusters, wherein k is at least 2; and wherein the determining the h highest ranking outlier time windows comprises voting, by the k clustering algorithms, a ranking of outlier attribute values in the time windows to determine the h highest ranking outlier time windows.

6. The method of claim 1, wherein the clustering the M-dimensional Shapely values comprises clustering the M-dimensional Shapely values using K clustering algorithms to generate respective K groups of clusters, wherein K is at least 2; and wherein the determining the H highest ranking M-dimensional Shapely value outliers comprises voting, by the K clustering algorithms, a ranking of M-dimensional Shapely value outliers to determine the H highest ranking M-dimensional Shapely value outliers.

7. The method of claim 1, wherein L is at least 2.

8. The method of claim 1, wherein performing the DTW is associated with aligning wave shapes of the N time series samples.

9. A computer program product, comprising one or more computer readable hardware storage devices having computer readable program code stored therein, the program code containing instructions executable by one or more processors of a computer system to implement a method for finding outliers in multi-dimensional time series samples, the method comprising:
dividing, by the one or more processors, each time series sample of N time series samples into at least 2 sub samples having equal time duration, wherein N is at least 2, wherein each time series sample is a M-dimensional time series sample having M dimensions, wherein M is at least 2, wherein each dimension of the M dimensions is a different attribute expressed as a function of time by each time series sample, wherein each sub sample is an M-dimensional sub sample having the M dimensions;
pre-training, by the one or more processors, each prediction model of L prediction models using the M-dimensional sub samples and obtaining, by the one or more processors from executing the L pre-trained prediction models with the N time series samples as input, an M-dimensional prediction result for each M-dimensional sub sample for each prediction model, wherein L is at least 1;
computing, by the one or more processors, a M-dimensional Shapely value corresponding to each M-dimensional prediction result for each M-dimensional sub sample for each prediction model, wherein each dimension of the M-dimensional Shapely value corresponds to a respective dimension of each M-dimensional time series sample;
clustering, by the one or more processors, the M-dimensional Shapely values for the M-dimensional sub samples for each prediction model to generate multiple clusters of M-dimensional Shapely values for each prediction model;
determining, by the one or more processors from analysis of the multiple clusters of the L prediction models, H highest ranking M-dimensional Shapely value outliers, wherein each of the H highest ranking M-dimensional Shapely value outliers is specific to one dimension of the M dimensions, wherein H is at least 1;
identifying, by the one or more processors, H outlier sub samples corresponding to the H highest ranking M-dimensional Shapely value outliers, wherein each of the H outlier sub samples is specific to the one dimension; and
aligning by the one or more processors and based on performing dynamic time warping (DTW), the N time series samples at each of the H outlier sub samples to obtain N aligned sub samples for each of the H outlier sub samples.

10. The computer program product of claim 9, the method further comprising:
dividing, by the one or more processors, each aligned sub sample of the N aligned sub samples into multiple time windows, wherein a time duration of each time window is a monotonically decreasing function of a volatility of attributes in each time window;
clustering, by the one or more processors, the attributes in each time window to generate a plurality of clusters for the attributes in each time window; and
determining, by the one or more processors from analysis of the plurality of clusters for the attributes in each time window, h highest ranking outlier time windows, wherein each of the h highest ranking outlier time windows is specific to a particular dimension of the M dimensions, sand wherein h is at least 1.

11. The computer program product of claim 10, wherein the volatility is a standard deviation of attribute values in each time window, and wherein the time duration of each time window varies inversely with the standard deviation.

12. The computer program product of claim 10, wherein the volatility is a variance of attribute values in each time window, and wherein the time duration of each time window varies inversely with the variance.

13. The computer program product of claim 10, wherein the clustering the attributes in each time window comprises clustering the attributes in each time window using k clustering algorithms to generate respective k groups of clusters in each time window representing the plurality of clusters, wherein k is at least 2; and wherein the determining the h highest ranking outlier time windows comprises voting, by the k clustering algorithms, a ranking of outlier attribute values in the time windows to determine the h highest ranking outlier time windows.

14. The computer program product of claim 9, wherein the clustering the M-dimensional Shapely values comprises clustering the M-dimensional Shapely values using K clustering algorithms to generate respective K groups of clusters, wherein K is at least 2; and wherein the determining the H highest ranking M-dimensional Shapely value outliers comprises voting, by the K clustering algorithms, a ranking of M-dimensional Shapely value outliers to determine the H highest ranking M-dimensional Shapely value outliers.

15. A computer system, comprising one or more processors, one or more memories, and one or more computer readable hardware storage devices, the one or more hardware storage devices containing program code executable by the one or more processors via the one or more memories to implement a method for finding outliers in multi-dimensional time series samples, the method comprising:

dividing, by the one or more processors, each time series sample of N time series samples into at least 2 sub samples having equal time duration, wherein N is at least 2, wherein each time series sample is a M-dimensional time series sample having M dimensions, wherein M is at least 2, wherein each dimension of the M dimensions is a different attribute expressed as a function of time by each time series sample, wherein each sub sample is an M-dimensional sub sample having the M dimensions;

pre-training, by the one or more processors, each prediction model of L prediction models using the M-dimensional sub samples and obtaining, by the one or more processors from executing the L pre-trained prediction models with the N time series samples as input, an M-dimensional prediction result for each M-dimensional sub sample for each prediction model, wherein L is at least 1;

computing, by the one or more processors, a M-dimensional Shapely value corresponding to each M-dimensional prediction result for each M-dimensional sub sample for each prediction model, wherein each dimension of the M-dimensional Shapely value corresponds to a respective dimension of each M-dimensional time series sample;

clustering, by the one or more processors, the M-dimensional Shapely values for the M-dimensional sub samples for each prediction model to generate multiple clusters of M-dimensional Shapely values for each prediction model;

determining, by the one or more processors from analysis of the multiple clusters of the L prediction models, H highest ranking M-dimensional Shapely value outliers, wherein each of the H highest ranking M-dimensional Shapely value outliers is specific to one dimension of the M dimensions, wherein His at least 1;

identifying, by the one or more processors, H outlier sub samples corresponding to the H highest ranking M-dimensional Shapely value outliers, wherein each of the H outlier sub samples is specific to the one dimension; and aligning by the one or more processors and based on performing dynamic time warping (DTW), the N time series samples at each of the H outlier sub samples to obtain N aligned sub samples for each of the H outlier sub samples.

16. The computer system of claim 15, the method further comprising:

dividing, by the one or more processors, each aligned sub sample of the N aligned sub samples into multiple time windows, wherein a time duration of each time window is a monotonically decreasing function of a volatility of attributes in each time window;

clustering, by the one or more processors, the attributes in each time window to generate a plurality of clusters for the attributes in each time window; and determining, by the one or more processors from analysis of the plurality of clusters for the attributes, h highest ranking outlier time windows, wherein each of the h highest ranking outlier time windows is specific to a particular dimension of the M dimensions, sand wherein h is at least 1.

17. The computer system of claim 16, wherein the volatility is a standard deviation of attribute values in each time window, and wherein the time duration of each time window varies inversely with the standard deviation.

18. The computer system of claim 16, wherein the volatility is a variance of attribute values in each time window, and wherein the time duration of each time window varies inversely with the variance.

19. The computer system of claim 16, wherein the clustering the attributes in each time window comprises clustering the attributes in each time window using k clustering algorithms to generate respective k groups of clusters in each time window representing the plurality of clusters, wherein k is at least 2; and wherein the determining the h highest ranking outlier time windows comprises voting, by the k clustering algorithms, a ranking of outlier attribute values in the time windows to determine the h highest ranking outlier time windows.

20. The computer system of claim 15, wherein the clustering the M-dimensional Shapely values comprises clustering the M-dimensional Shapely values using K clustering algorithms to generate respective K groups of clusters, wherein K is at least 2; and wherein the determining the H highest ranking M-dimensional Shapely value outliers comprises voting, by the K clustering algorithms, a ranking of M-dimensional Shapely value outliers to determine the H highest ranking M-dimensional Shapely value outliers.

* * * * *